(12) United States Patent
Rosenzweig

(10) Patent No.: US 7,277,722 B2
(45) Date of Patent: Oct. 2, 2007

(54) REDUCING UNDESIRABLE AUDIO SIGNALS

(75) Inventor: Michael D. Rosenzweig, Hopkinton, MA (US)

(73) Assignee: Intel Corporation, Santa Clara, CA (US)

( * ) Notice: Subject to any disclaimer, the term of this patent is extended or adjusted under 35 U.S.C. 154(b) by 866 days.

(21) Appl. No.: 09/892,681

(22) Filed: Jun. 27, 2001

(65) Prior Publication Data

US 2003/0003944 A1    Jan. 2, 2003

(51) Int. Cl.
H04M 1/00 (2006.01)
H04B 1/10 (2006.01)

(52) U.S. Cl. .................. 455/550.1; 455/296

(58) Field of Classification Search ........... 455/296, 455/297, 303, 304, 305, 306, 310, 311, 333, 455/550.1
See application file for complete search history.

(56) References Cited

U.S. PATENT DOCUMENTS

| | | | | |
|---|---|---|---|---|
| 4,654,871 A | * | 3/1987 | Chaplin et al. ............... 381/72 |
| 5,689,572 A | * | 11/1997 | Ohki et al. ................ 381/71.3 |
| 5,706,394 A | * | 1/1998 | Wynn ........................ 704/219 |
| 5,737,433 A | * | 4/1998 | Gardner ..................... 381/94.7 |
| 5,796,850 A | * | 8/1998 | Shiono et al. ............. 381/94.1 |
| 6,021,207 A | * | 2/2000 | Puthuff et al. .............. 381/330 |
| 6,035,047 A | * | 3/2000 | Lewis ......................... 381/72 |
| 6,118,878 A | * | 9/2000 | Jones ........................... 381/72 |
| 6,230,123 B1 | * | 5/2001 | Mekuria et al. ............ 704/226 |
| 6,407,325 B2 | * | 6/2002 | Yi et al. ....................... 84/610 |
| 6,658,267 B1 | * | 12/2003 | Baranowski et al. ....... 455/344 |
| 6,738,481 B2 | * | 5/2004 | Krasny et al. ............. 381/94.1 |
| 6,782,106 B1 | * | 8/2004 | Kong et al. ................... 381/74 |
| 6,954,652 B1 | * | 10/2005 | Sakanashi ................ 455/550.1 |
| 6,966,647 B2 | * | 11/2005 | Jannard et al. ............. 351/158 |
| 7,065,342 B1 | * | 6/2006 | Rolf ........................ 455/412.1 |
| 2001/0046304 A1 | * | 11/2001 | Rast |
| 2002/0110256 A1 | * | 8/2002 | Watson et al. |
| 2002/0111189 A1 | * | 8/2002 | Chou ......................... 455/557 |
| 2002/0141599 A1 | * | 10/2002 | Trajkovic et al. |
| 2002/0161576 A1 | * | 10/2002 | Benyassine et al. |
| 2003/0027600 A1 | * | 2/2003 | Krasny et al. |

* cited by examiner

*Primary Examiner*—William J. Deane, Jr.
(74) *Attorney, Agent, or Firm*—Trop, Pruner & Hu, P.C.

(57) ABSTRACT

A way of reducing undesirable audio signals is provided. A portable device is provided that comprises a sensor to sense an audio signal and a control unit that is communicatively coupled to the sensor. The control unit is provided to receive a first audio signal from a storage unit and to generate a second audio signal based on at least a portion of the sensed audio signal to reduce an undesirable audio signal. The control unit is further provided to combine the first audio signal and the second audio signal and to provide the combined signal through a speaker.

22 Claims, 3 Drawing Sheets

REDUCING UNDESIRABLE AUDIO SIGNALS

BACKGROUND

This invention relates generally to reducing undesirable audio signals, and, more particularly, to reducing undesirable audio signals using portable devices.

Portable electronic devices of various types have become prevalent for everyday use. For example, it is not uncommon to find consumers today using cellular phones, personal digital assistants (PDAs), pagers, portable music players such as MP3 (Moving Pictures Expert Group, Layer 3) players, and other types of music players.

Portable devices of the current generation are generally more flexible, robust, and even smaller in size than their predecessors. The relative small size of today's portable devices makes it convenient for users to carry them to practically any desired destination. Users on the move, however, are sometimes compelled to use the portable devices in an unfriendly environment where undesirable audio signals may be prevalent. For example, while riding in an automobile, a user of a wireless phone may be subjected to a constant, unappealing or disturbing sound of the automobile engine. As another example, a user attempting to listen to music at home on a portable device may be disturbed by the undesirable sound of a vacuum cleaner. The users of such portable devices may similarly be disturbed by a variety of other undesirable audio signals in other environments.

Accordingly, there is a need for an improved way of reducing undesirable audio signals.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION

Figure 1:
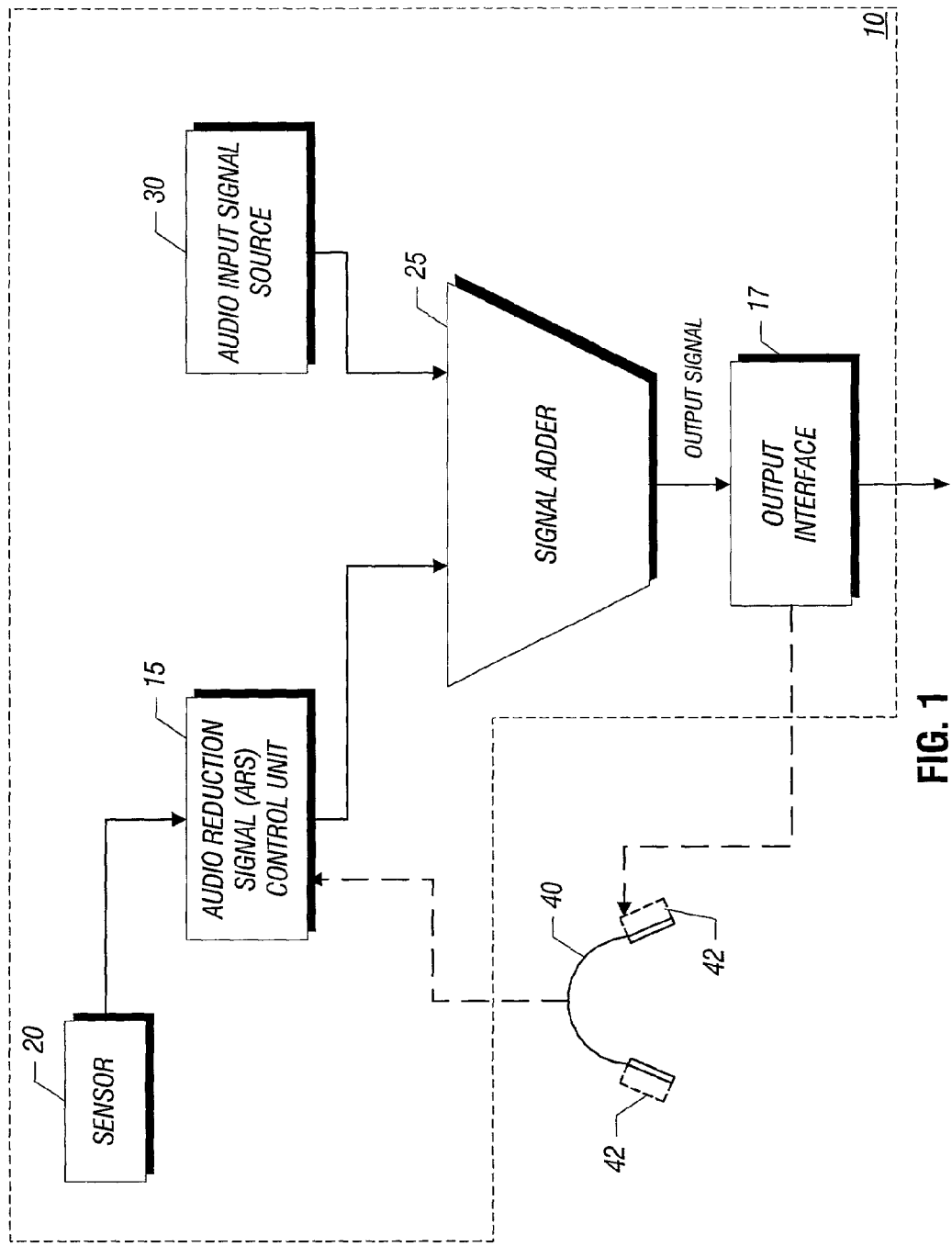
FIG. 1 is a stylized block diagram of a portable device, in accordance with one embodiment of the present invention.

Referring now to FIG. 1, a block diagram of a portable device 10 in accordance with one embodiment of the present invention is illustrated. The portable device 10, in one embodiment, may be a computer, personal digital assistant (PDA), video camera, pager, portable music player, and the like. The portable device 10, in one embodiment, may be a communications device, such as a wireless phone, a pager, or any other device capable of transmitting and receiving information to and from another device. In one embodiment, the portable device 10 may be a readily transportable device, such as a hand-held device. The portable device 10, in one embodiment, may be a battery-powered device where the battery serves as the main power supply for the portable device 10 for the duration during which no electrical power is supplied from an external, fixed power source, such as an electrical outlet.

As described in more detail below, the portable device 10, in one embodiment, includes an audio reduction signal (ARS) control unit 15 that generates an audio reduction signal (ARS) that, when provided through an output interface 17, may be able to reduce undesirable audio signals that are sensed by a sensor 20 or are otherwise audible to the user of the portable device 10. The term "undesirable audio signals," as utilized herein, may generally refer to one of many undesirable sounds that may be audible to a user of the portable device 10, sounds such as those from engines of operating vehicles, machinery, heavy winds, vacuum cleaners and the like. In one embodiment, the "undesirable audio signals" may include low frequency, high frequency or constant frequency sounds.

In one embodiment, the ARS control unit 15 receives a sensed signal from the sensor 20. Although not so limited, in one embodiment, the sensor 20 may be a microphone that is able to sense audio signals while the portable device 10 is in use. The ARS control unit 15, in one embodiment, generates an audio reduction signal that is provided to a signal adder 25. The signal adder 25, in one embodiment, receives an audio input signal from source 30 and combines the audio reduction signal from the ARS control unit 15 with the audio input signal. The output of the signal adder 25 may be provided to the output interface 17.

The source 30 may be one of a variety of sources of audio signals, depending on the particular implementation. For example, if the portable device 10 is a music player, then the source 30 may represent a storage unit (e.g., diskette, hard drive, compact disc) on which music may be stored. As an additional example, the source 30 may be a coder and decoder (codec) of a wireless phone. In other embodiments, the source 30 of the input signal may vary depending on the implementation. Although the source 36 in the illustrated embodiment provides an audio signal, in an alternative embodiment, the source 30 may provide a video signal instead. Thus, in one embodiment, the signal adder 25 may combine the audio reduction signal generated by the control unit 15 and the video signal from the source 30.

The output interface 17, in one embodiment, may serve as an interface to one or more speakers of the portable device 10. In an alternative embodiment, the output interface 17 may be an interface to a headphone set 40. In one embodiment, the headphone set 40 may include one or more sensors 42 for sensing undesirable audio signals that may then be provided to the control unit 15. In some instances it may be desirable to remove or at least reduce undesirable or unpleasant sounds that a user hears, and, as such, it may be advantageous to sense these sounds closer to the user's ears. For this reason, in an alternative embodiment, the sensors 42 on the headphone set 40 may be employed instead of the sensor 20. In one embodiment, both the sensor 42 and the sensor 20 may be utilized to sense undesirable audio signals.

Figure 2:
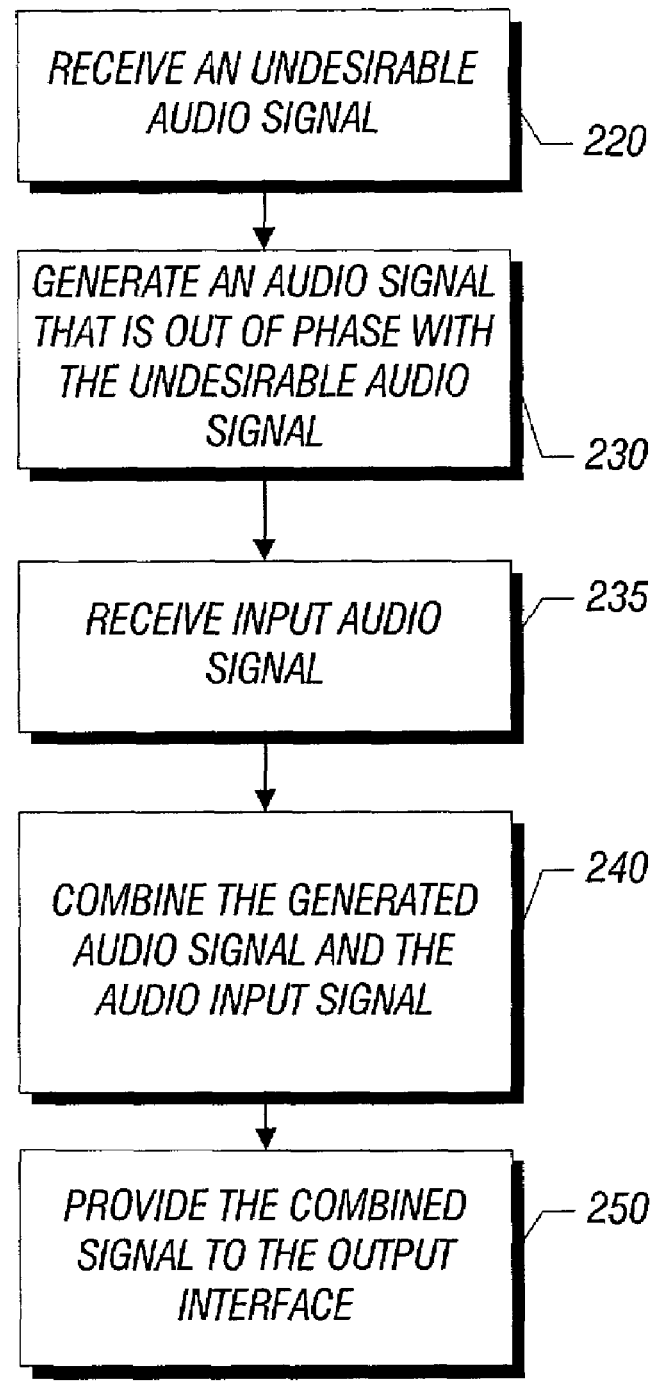
FIG. 2 is a flow diagram of a method that may be employed by the portable device of FIG. 1, in accordance with one embodiment of the present invention.

Referring now to FIG. 2, a flow diagram of a method that may be employed by the portable device 10 of FIG. 1 is illustrated, in accordance with one embodiment of the present invention. The control unit 15 of the portable device 10, in one embodiment, receives (at 220) an undesirable audio signal from the sensor 20. Alternatively, the one or more sensors 42 may sense the undesirable audio signal that is provided to the control unit 15, in one embodiment. The control unit 15 generates (at 230) an audio reduction signal that, in one embodiment, is out of phase with the received (at 220) signal. In one embodiment, the generated audio signal is substantially 180 degrees out of phase with the received (at 220) signal.

The portable device 10 receives (at 235) an input audio signal from the audio input signal source 30. As mentioned, the input audio signal may vary depending on the implementation. The signal adder 25, in one embodiment, combines (at 240) the generated (at 230) signal with the received (at 235) input audio signal. The signal adder 25 provides (at 250), in one embodiment, the combined signal to the output interface 17, such as a speaker.

The combined (at 240) signal may be played through a speaker, in one embodiment. The generated (at 230) signal, when played through the speaker, may reduce the undesirable audio signal that may have otherwise been audible to the user of the portable device 10. In one embodiment, the undesirable audio signal may be reduced to a level that is no longer audible to the user. It may be possible to reduce, or even cancel, the undesirable audio signal because the generated (at 230) signal, when delivered through the speaker, offsets at least a portion of the out of phase undesirable audio signals.

Figure 3:
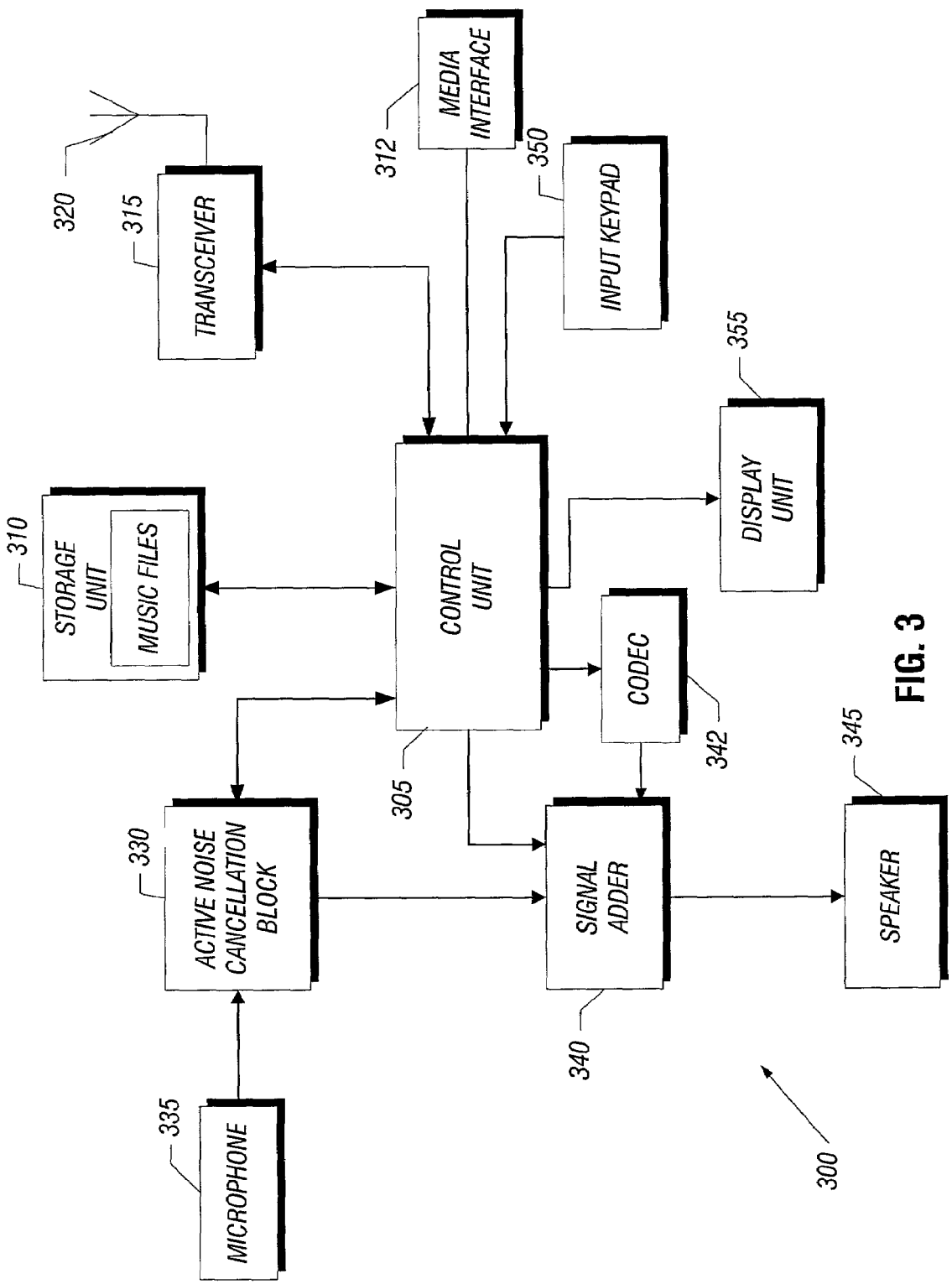
FIG. 3 is a block diagram of a wireless phone, in accordance with one embodiment of the present invention.

Referring now to FIG. 3, a block diagram of the portable device 10 of FIG. 1 is illustrated in accordance with an alternative embodiment of the present invention. In particular, in the illustrated embodiment the portable device 10 is a wireless phone 300. The wireless phone 300, in one embodiment, includes a control unit 305 that is communicatively coupled to a storage unit 310. The storage unit 310, in one embodiment, may have stored therein an operating system, protocol stack, and/or application. In one embodiment, the storage unit 310 may include one or music files that may be played by the wireless phone 300. That is, in one embodiment, the wireless phone 300 may also serve as a music player that is capable of playing music files having one of several formats, such as the MP3 format. In one embodiment, the wireless phone 300 may include a media interface 312 for reading and/or writing information (such as music files) on removable media, such as diskettes, compact discs, and the like.

The wireless phone 300, in one embodiment, includes a transceiver 315 that is communicatively coupled to an antenna 320 through which information may be transmitted or received over a wireless medium. For example, the transceiver 315 may transmit and/or receive voice signals over a wireless medium.

The wireless phone 300, in one embodiment, may include an active noise cancellation block 330, which, as described in more detail below, is capable of generating a signal that reduces or cancels unwanted background noise. The active noise cancellation block 330, in one embodiment, generates its signal based on an input signal received from a microphone 335. The active noise cancellation block 330 may be implemented in software, hardware, or a combination of both. For example, in one embodiment, if the active noise cancellation block 330 is implemented in software, it may be stored in the storage unit 310. The active noise cancellation block 330 may be one embodiment of the audio signal reduction control unit 15 of FIG. 1.

The wireless phone 300, in one embodiment, includes a signal adder 340 that receives the output signal from the active noise cancellation block 330 and a CODEC 342 and provides an output signal to a speaker 345. The CODEC 342, in one embodiment, decodes voice signals received by the transceiver 315. In some embodiments, such as when the wireless phone 300 is utilized to play music files, the CODEC 342 may be bypassed, if desired. In one embodiment, the CODEC 342 converts digital signals to analog signals, which may then be provided to the signal adder 340.

The operation of the wireless phone 300, in one embodiment, may include the microphone 335 detecting an undesirable audio signal, which may then be provided to the active noise cancellation block 330. The active noise cancellation block 330, based on the signal received from the microphone 335, generates an audio reduction signal. The audio reduction signal, for example, may be a signal that is out of phase with the signal received from the microphone 335. In one embodiment, the audio reduction signal may be substantially 180 degrees out of phase with the received signal. The audio reduction signal may then be provided to the signal adder 340, which, in one embodiment, adds the audio reduction signal with other audio signals (e.g., voice, music) and provides its output signal to the speaker 345. When the output from the signal adder 340 is played through the speaker 345, the out-of-phase audio reduction signal (generated by the active noise cancellation block 330) may reduce the undesirable audio signal that is otherwise audible to the user of the wireless phone 300. Since, in one embodiment, the output signal of the signal adder 340 may also include other audio signals, such as the voice of the remote party, the user of the wireless phone 300 may be able to engage in conversation with the other party, with reduced undesirable audio signals in the background.

The wireless phone 300, in one embodiment, includes an input keypad 350 and a display unit 355. The input keypad 350, in one embodiment, allows a user to enter numeric or alphanumeric data. The keypad 350 may include control keys, such as arrows keys, that enable a user to maneuver through a graphical user interface displayed on the display unit 355, in one embodiment. The input keypad 350, in one embodiment, may include a power "on/off" key (or other activatable element) to activate or deactivate the wireless phone 300. In one embodiment, the functionality of the display unit 355 and input keypad 350 may be integrated into a single device, such as a touch-sensitive display.

In one embodiment, if desired, the active noise cancellation block 330 and/or the signal adder 340 may be able to process digital signals. As such, the signal received from the microphone 335 may be converted to a digital signal, in one embodiment, before it is provided to the active noise cancellation block 330. Alternatively, in one embodiment, the active noise cancellation block 330 may itself perform the digital conversion. Additionally, the output of the signal adder 340, in one embodiment, may be converted from a digital-to-analog form, where the signal adder 340 itself or a separate digital-to-analog converter may be utilized for analog conversion. If the signal adder 340 is adapted to receive digital signals, then, in one embodiment, the CODEC 342 may not need to perform digital-to-analog conversion.

In one embodiment, the active noise cancellation block 330 may generate the audio reduction signal based on one or more selected characteristics of the signal received from the microphone 335. For example, in one embodiment, the active noise cancellation block 330 may filter selected frequencies (e.g., frequencies in the voice band range) of the received signal before generating the audio reduction signal. Filtering selected frequencies may be desirable, for instance, to prevent the audio reduction signal, when played through the speaker 345, from reducing certain audible signals, such as voices. Thus, in one embodiment, the active noise cancellation block 330 may generate the audio reduction signal based on only selected frequencies (or range of frequencies) of the undesirable audio signal that are desired to be reduced or otherwise cancelled. In another embodiment, the active noise cancellation block 330 may generate the audio reduction signal based on the amplitude of the signal received from the microphone 335. That is, in one embodiment, the audio reduction signal may be generated based on only signals from the microphone 335 that are either above or below a threshold value. Generating the audio reduction signal based on the amplitude threshold may allow the wireless phone 300 to reduce or otherwise remove undesirable audio signals that are above a selected threshold level, for example. In one embodiment, the audio reduction signal is based on both selected frequencies and amplitude levels of the signal received from the microphone 335.

In one embodiment, a user may be able to use the wireless phone 300 to simply reduce undesirable audio signals. That is, using the input keypad 350, in one embodiment, the user may be able to activate the active noise cancellation feature of the wireless phone 300 without being on the phone itself. Thus, for example, a user in the process of driving in an automobile may activate the active noise cancellation feature to reduce background sound, such as the noise of the engine. At an airport, the user may be able to reduce airplane noise in the background, for example. Similarly, the wireless phone 300 may be utilized, in one embodiment, to reduce undesirable audio signals in other settings or environments as well.

One or more embodiments of the present invention may provide selected advantages to the user of the portable device 10. For example, with the advent of one or more embodiments of the portable device 10, it may be possible to reduce, or even remove, undesirable audio signals. In another embodiment, the undesirable audio signals may be reduced using a control unit 305 for processing audio signals (e.g., voice, music) and for generating an (undesirable) audio reduction signal. As such, in some instances, the need for multiple or separate processors (e.g., one for processing audio signals and another for reducing undesirable audio signals) may be avoided. In some cases, with the advent of one or more embodiments, a user may readily carry the portable device 10 to a noisy location to reduce undesirable sounds.

It should be noted that configuration of the wireless phone 300 is illustrative only, and that in alternative embodiments, other configurations with more or fewer elements may be employed. For example, in an alternate embodiment, additional components (such as bridges or other integrated circuits) may be present between the control unit 305 and one or more of the components (e.g., CODEC 342, media interface 312, display unit 355). Similarly, other components (such as buffers, caches or other circuitry) may be employed between the control unit 305 and the storage unit 310. In one embodiment, one or more amplifiers may be utilized to amplify signals, such as the output signal of the signal adder 340 before it is provided to the speaker. Similarly, other configurations of the portable device 300 may be employed without deviating from the spirit and/or scope of one or more embodiments of the present invention.

The various system layers, routines, or modules may be executable control units (such as control unit 15 and 305 (see FIGS. 1 and 3)). Each control unit may include a microprocessor, a digital signal processor, a microcontroller, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A portable device, comprising:
a sensor to sense an undesirable audio signal present in an environment in which the portable device is to operate; and
a control unit communicatively coupled to the sensor, the control unit to receive data from a storage unit of the portable device and generate a first audio signal therefrom for output to a speaker of the portable device, generate a second audio signal based on at least a portion of the undesirable audio signal to reduce the undesirable audio signal, the second audio signal substantially 180° out of phase with the undesirable audio signal, combine the first audio signal and the second audio signal, and provide the combined signal to the speaker.

2. The portable device of claim 1, wherein the sensor is a microphone.

3. The portable device of claim 1, wherein the sensor is located on a headphone set to be interfaced with the portable device.

4. A method, comprising:
receiving a first audio signal from a storage unit of a portable device;
converting the first audio signal to an analog audio signal;
generating a second audio signal to reduce undesirable sound present in an environment in which the portable device is to operate based on a frequency and an amplitude of a detected signal including the undesirable sound; and
combining the analog audio signal and the second audio signal in the portable device.

5. The method of claim 4, further comprising providing the combined signal to a speaker of the portable device.

6. The method of claim 4, wherein receiving the first audio signal comprises receiving a signal comprising at least one of voice and music data.

7. A wireless phone, comprising:
a transceiver;
a speaker;
a storage medium to store at least one audio file; and
a control unit to process the at least one audio file received from the storage medium into a first audio signal of a digital form, generate a second audio signal of a digital form to reduce an undesirable audio signal, combine the first audio signal and the second audio signal in the digital form, convert the combined digital signal to a combined analog signal, and provide the combined analog signal to the speaker.

8. The wireless phone of claim 7, further comprising at least one sensor to sense an audio signal, wherein the control unit to generate the second audio signal based on the sensed audio signal.

9. The wireless phone of claim 8, further comprising a CODEC to process the first audio signal.

10. The wireless phone of claim 8, wherein the control unit to generate the second audio signal substantially 180 degrees out of phase with sensed audio signal.

11. A wireless phone of claim 7, further comprising an interface to allow the wireless phone to reduce the undesirable audio signal while the transceiver is not in use.

12. The wireless phone of claim 7, wherein the storage medium comprises a removable storage.

13. The wireless phone of claim 7, further comprising a plurality of sensors to sense audio signals.

14. A communications device, comprising:
an output interface;
a sensor to sense an audio signal;
a generator to generate an audio reduction signal based on at least a portion of the sensed audio signal, wherein the portion of the sensed audio signal corresponds an undesirable audio signal present in an environment in which the communications device is to operate;
a signal adder to combine a second audio signal of a video signal to be provided to a display of the communications device with the audio reduction signal; and
a control unit to provide the combined signal to the output interface.

15. The communications device of claim 14, wherein the control unit to convert the second audio signal to an analog signal.

16. The communications device of claim 14, wherein the sensor is a microphone and the output interface comprises an interface to a speaker.

17. The wireless phone of claim 7, further comprising a signal adder coupled to the control unit to combine the first audio signal and the second audio signal.

18. The communications device of claim 14, wherein the control unit to combine the second audio signal with the audio reduction signal in a digital form and convert the digital form into an analog form of the combined signal.

19. The communications device of claim 14, wherein the control unit is to provide the combined signal when the communications device is not in communication with a remote entity.

20. The communications device of claim 14, wherein the second audio signal comprises at least one of voice and music data.

21. The communications device of claim 14, further comprising a storage to store the second audio signal prior to the combining.

22. The communications device of claim 21, further comprising a media interface to read and/or write the second audio signal onto the storage.

* * * * *

UNITED STATES PATENT AND TRADEMARK OFFICE
CERTIFICATE OF CORRECTION

PATENT NO. : 7,277,722 B2 Page 1 of 1
APPLICATION NO. : 09/892681
DATED : October 2, 2007
INVENTOR(S) : Michael D. Rosenzweig It is certified that error appears in the above-identified patent and that said Letters Patent is hereby corrected as shown below:

Column 8:
Line 22, "14" should be --20--.

Signed and Sealed this

Twenty-fifth Day of December, 2007

JON W. DUDAS
*Director of the United States Patent and Trademark Office*